United States Patent
Peng et al.

(10) Patent No.: US 10,872,018 B2
(45) Date of Patent: Dec. 22, 2020

(54) MEMORY DATA PRESERVATION SOLUTION

(71) Applicant: QUANTA COMPUTER INC., Taoyuan (TW)

(72) Inventors: Chi-Han Peng, Taoyuan (TW); Chun-Ching Yu, Taoyuan (TW); Shuen-Hung Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/985,349

(22) Filed: May 21, 2018

(65) Prior Publication Data
US 2019/0235965 A1 Aug. 1, 2019

Related U.S. Application Data

(60) Provisional application No. 62/623,717, filed on Jan. 30, 2018.

(51) Int. Cl.
*G06F 3/06* (2006.01)
*G06F 11/14* (2006.01)
(Continued)

(52) U.S. Cl.
CPC ............ *G06F 11/1456* (2013.01); *G06F 1/30* (2013.01); *G06F 1/3225* (2013.01); *G06F 11/1441* (2013.01); *G06F 11/1448* (2013.01)

(58) Field of Classification Search
CPC .................................................. G06F 11/1456
(Continued)

(56) References Cited

U.S. PATENT DOCUMENTS

2003/0070035 A1 * 4/2003 Wang .................... G06F 9/4401
711/103
2007/0033431 A1 2/2007 Pecone et al.
(Continued)

FOREIGN PATENT DOCUMENTS

CN 102272734 A 12/2011
CN 103544080 A 1/2014
(Continued)

OTHER PUBLICATIONS

Extended European Search Report for EP Application No. 18188223.4, dated Mar. 8, 2019.
(Continued)

*Primary Examiner* — Jae U Yu
(74) *Attorney, Agent, or Firm* — Nixon Peabody LLP

(57) ABSTRACT

Systems and methods are provided for preserving data in memory modules of a computer system. An exemplary method can detect that a software preservation process is needed for a computer system, and thereafter performs the software preservation process. The software preservation process can begin by detecting the initiation of a reduced power mode in a computer system. A syncing process of data contents can then be initiated in a processing unit of the computer system. Next, the computer system can automatically save data contents of a memory module. The software preservation process is completed by turning off a power supply unit of the computer system.

18 Claims, 6 Drawing Sheets

(51) Int. Cl.
    *G06F 1/30*         (2006.01)
    *G06F 1/3225*      (2019.01)

(58) Field of Classification Search
    USPC .......................................................... 711/162
    See application file for complete search history.

(56) References Cited

U.S. PATENT DOCUMENTS

| | | | |
|---|---|---|---|
| 2013/0067136 A1* | 3/2013 | Bates | G06F 12/0238 |
| | | | 711/103 |
| 2015/0089287 A1 | 3/2015 | Jayakumar et al. | |
| 2015/0234607 A1* | 8/2015 | Umeda | G06F 11/1441 |
| | | | 711/103 |
| 2016/0364336 A1 | 12/2016 | Lamb | |
| 2017/0091042 A1 | 3/2017 | Chou et al. | |

FOREIGN PATENT DOCUMENTS

| | | | |
|---|---|---|---|
| CN | 105893196 A | 8/2016 | |
| CN | 107591171 A | 1/2018 | |
| EP | 2566293 A1 | 3/2013 | |
| JP | H0944418 A | 2/1997 | |
| JP | H10240367 A | 9/1998 | |
| JP | 2013065261 A | 4/2013 | |
| JP | 2015222903 A | 12/2015 | |
| JP | 2016014957 A | 1/2016 | |
| JP | 2017045379 A | 3/2017 | |
| TW | 201426271 A | 7/2014 | |
| TW | 201430853 A | 8/2014 | |
| TW | 201712554 A | 4/2017 | |

OTHER PUBLICATIONS

TW Office Action for Application No. 107124951, dated Jul. 29, 2019, w/ First Office Action Summary.
TW Search Report for Application No. 107124951, dated Jul. 29, 2019, w/ First Office Action.
JP Office Action for Application No. 2018-160456, dated Oct. 8, 2019, w/ First Office Action Summary.
JP Office Action for Application No. 2018-160456, dated Aug. 25, 2020, w/ Second Office Action Summary.
CN Office Action for Application No. 2018-11086217.3, dated Jun. 1, 2020, w/ First Office Action Summary.
CN Search Report for Application No. 2018-11086217.3, dated Jun. 1, 2020, w/ First Office Action.

\* cited by examiner

MEMORY DATA PRESERVATION SOLUTION

CROSS-REFERENCE TO RELATED APPLICATIONS

This application claims priority to and the benefit of U.S. Provisional Patent Application No. 62/623,717, entitled "ENHANCEMENT NVDIMM MEMORY DATA PROTECTION SOLUTION" and filed on Jan. 30, 2018, the contents of which are hereby incorporated by reference in their entirety as if fully set forth herein.

FIELD OF THE INVENTION

The present invention relates to software data preservation, and more specifically to systems and methods for preserving data in a computer system when the computer system loses power.

BACKGROUND

Computer systems deal with large inputs of data and have several memory modules to accommodate the data. Data moves dynamically through the computer system. As a consequence of dynamic data movement, data is not necessarily stored in a recoverable storage location if a sudden shutdown occurs. Data can be stored in both volatile and non-volatile computer components during operation. Volatile components allow data to be used during operation when the computer system has electrical power. If electrical power is lost, the volatile component will not retain any data. In contrast, non-volatile components can retain data in the absence of electrical power. Non-volatile components can be distinct from memory storage components, like hard drives. Hard drives take time to write and read data. Therefore, if a computer is about to lose power suddenly, a volatile component may not have enough time to write its data to a permanent storage component before the computer shutdown.

Some computer systems have processes designed to protect data when electrical power to the computer system is lost. For example, in conventional computer systems, a non-volatile dual in-line memory module (NVDIMM) can retain data contents from memory modules and the central processing unit (CPU) even when electrical power is lost. Conventional procedures set a timer before the power supply unit is actually turned off. Volatile components can convert their data to non-volatile components during this time. This timer can be problematic because it is not always an accurate portrayal of the time needed to preserve data. Additionally, these conventional data preservation processes do not have tailored procedures for situations when the computer system knows it is about to shut down but has not actually lost power yet.

What is needed is a mechanism for preserving data not only during a loss of electrical power, but also in all other scenarios where data can be lost. For example, the mechanism should account for a software-initiated shutdown mode, a software-initiated restart mode, a user-initiated shutdown mode, a user-initiated restart mode, and a shutdown triggered by overheating computer components. The mechanism further needs to ensure that as much data as possible is preserved before the system loses power.

SUMMARY

The various examples of the present disclosure are directed towards a computer-implemented method for a software data preservation process that preserves data when a computer system goes into a reduced power mode. In a first embodiment, the computer system detects that a software data preservation process is needed and then performs the software data preservation process. It does so by detecting initiation of a reduced power mode and then initiating a syncing process of data contents in a processing unit. The method then automatically saves the data contents of a memory module and turns off a power supply unit.

The present disclosure also provides for a computer system configured for preserving data in memory modules. The computer system can comprise a power supply unit, memory modules, a processing unit, a controller hub, and a logic device. The memory modules can be configured to store data contents. The processing unit can be configured to start a memory self-refresh process with the memory modules upon receiving notification to start a syncing process. The controller hub can be configured to start a software data preservation process. The controller hub can complete the steps of detecting initiation of a reduced power mode and initiating a syncing process in the processing unit. The logic device can be configured to continue the software data preservation process. The logic device can also complete the steps of automatically saving data contents in a memory module and turning off a power supply unit.

The reduced power mode can be a temporary low power mode, a software-initiated shutdown mode, a software-initiated restart mode, a user-initiated shutdown mode, a user-initiated restart mode, or a shutdown triggered by overheating computer components.

In one example, the reduced power mode can be the software-initiated restart mode or the user-initiated restart mode. After turning off the power supply unit, the software data preservation process can further comprise ending the reduced power mode and rebooting the computer system.

In another example, the reduced power mode can be the shutdown triggered by overheating computer components. Instead of detecting initiation of a reduced power mode, the software data preservation process can receive input from the processing unit or a controller hub that the computer system is overheating. The software data preservation process can respond by triggering a power button to overwrite itself and turn off the power supply unit.

In some embodiments, the syncing process of data contents in a processing unit can comprise copying data from volatile memory of the processing unit. The copied data can then be placed into the non-volatile memory of the memory module.

In some embodiments, saving data contents of a memory module can comprise saving the data contents into a non-volatile computer component.

Throughout the present disclosure, the terms "personal computer," "server system," "laptop computer," "computer system," and "tablet" can be used interchangeably to identify any electronic computing system which has physical memory modules somewhere in the system.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. These drawings depict only example aspects of the disclosure and are not therefore to be considered to be limiting of its scope. The principles herein are described and explained with additional specificity and detail through the use of the accompanying drawings in which.

DETAILED DESCRIPTION

Figure 1A:
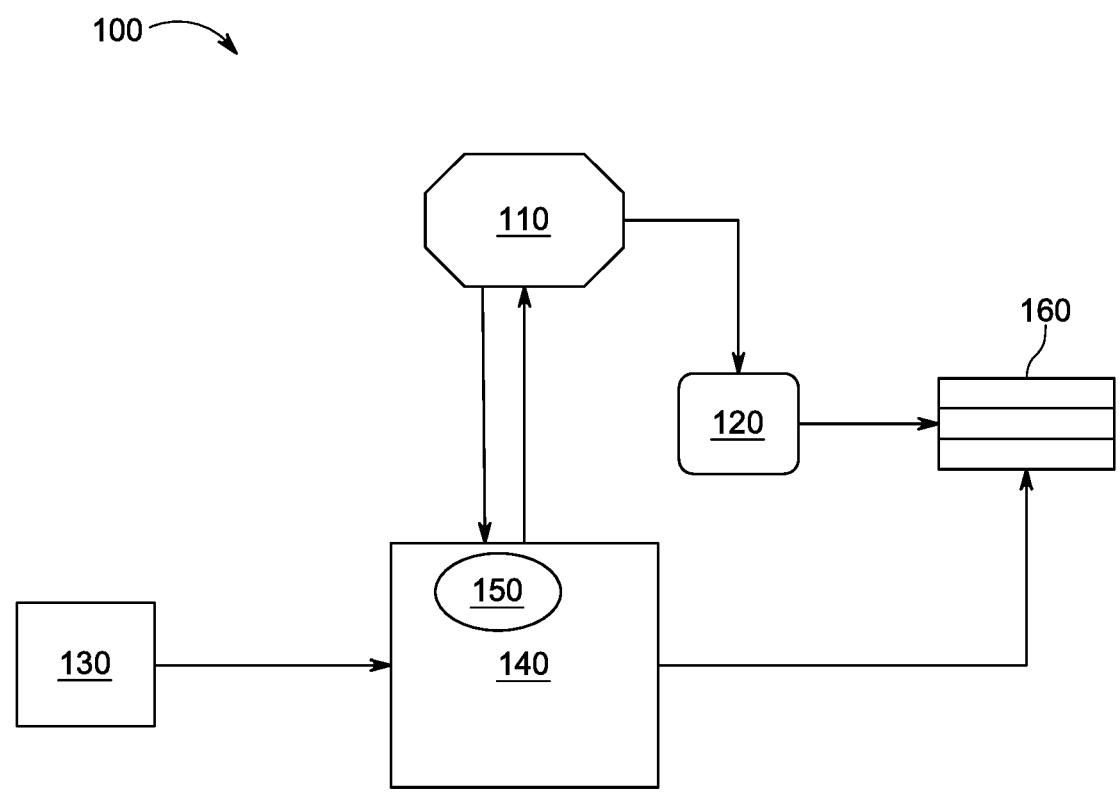
FIG. 1A shows a diagram of an exemplary configuration of a computer system, according to a contemporary data preservation module.

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed towards a method which can move data to non-volatile memory modules efficiently from processing units, controller hubs, and other volatile computer components. The method relies on communication to and from more components than the conventional method, such that the system allows for accurate and stable storage of data without relying on a timer function. Additionally, the system provides for a management unit which can automatically detect when the system is about to shut down due to overheating components. The management component can independently ensure data is preserved in non-volatile components.

In view of the limitations of existing software data preservation processes, the present disclosure is directed to preserving data in memory modules during all possible shutdown or low power operation scenarios of a computer system. The system detects the shutdown or low power operation mode into which the computer system is entering. The system then provides a tailored series of steps for that scenario. In this way, the present disclosure allows for efficient preservation of data regardless of whether the shutdown is user-initiated, software-initiated, or hardware-initiated. Additionally, the present disclosure provides different steps based on whether the computer system is transitioning into a sleep mode, a restart mode, or a cold shutdown mode.

FIG. 1A shows a conventional NVDIMM application system 100 which is only triggered to preserve data when AC power is lost. System 100 includes a platform controller hub (PCH) 110, a central processing unit (CPU) 120, a power supply 130, a complex programmable logic device (CPLD) 140, a logic circuit 150, and a memory module 160. The PCH 110 can control the movement of data through the entire system 100 and support operation of applications hosted on the system 100 when the PCH 110 is used in conjunction with the CPU 120. As shown in FIG. 1A, the PCH 110 can communicate directly with the CPU 120 and the CPLD 140. The PCH 110 can be a general-purpose input/output (GPIO), an Intel chipset, a serial advanced technology attachment (SATA), a universal serial bus (USB), a power sequence, or any other device as used in the art.

The CPU 120 provides assignment of tasks and oversees writing data to the memory module 160. The power supply 130 provides electrical power to the system 100. The system 100 cannot operate without electrical power supplied by the PSU. The system 100 will automatically cease operation if the power supply unit 130 is removed. The CPLD 140 contains logic which can implement complex logical processes resulting from communication with other computer components. The CPLD 140 inputs signals to other program logic units and outputs. The CPLD 140 can be configured as a physical logic device, such as a negative-AND gate (NAND gate), an AND gate, an OR gate, an XOR gate, or any other device as used in the art.

The logic circuit 150 can be housed within the CPLD 140 and provides the actual physical mechanism by which the CPLD 140 functions. For example, the logic circuit 150 can identify when the power supply 130 is operational and notify the PCH 110 of the power supply's 130 status. The memory module 160 can store data permanently such that even if the system 100 shuts down, the contents on the memory module 160 can be permanently preserved.

The arrows between the components demonstrate various ways that the different components of the computer system 100 can communicate with each other. The communication between components travels as independent, external signals between the components. These communications are discussed below with respect to FIG. 1B.

Figure 1B:
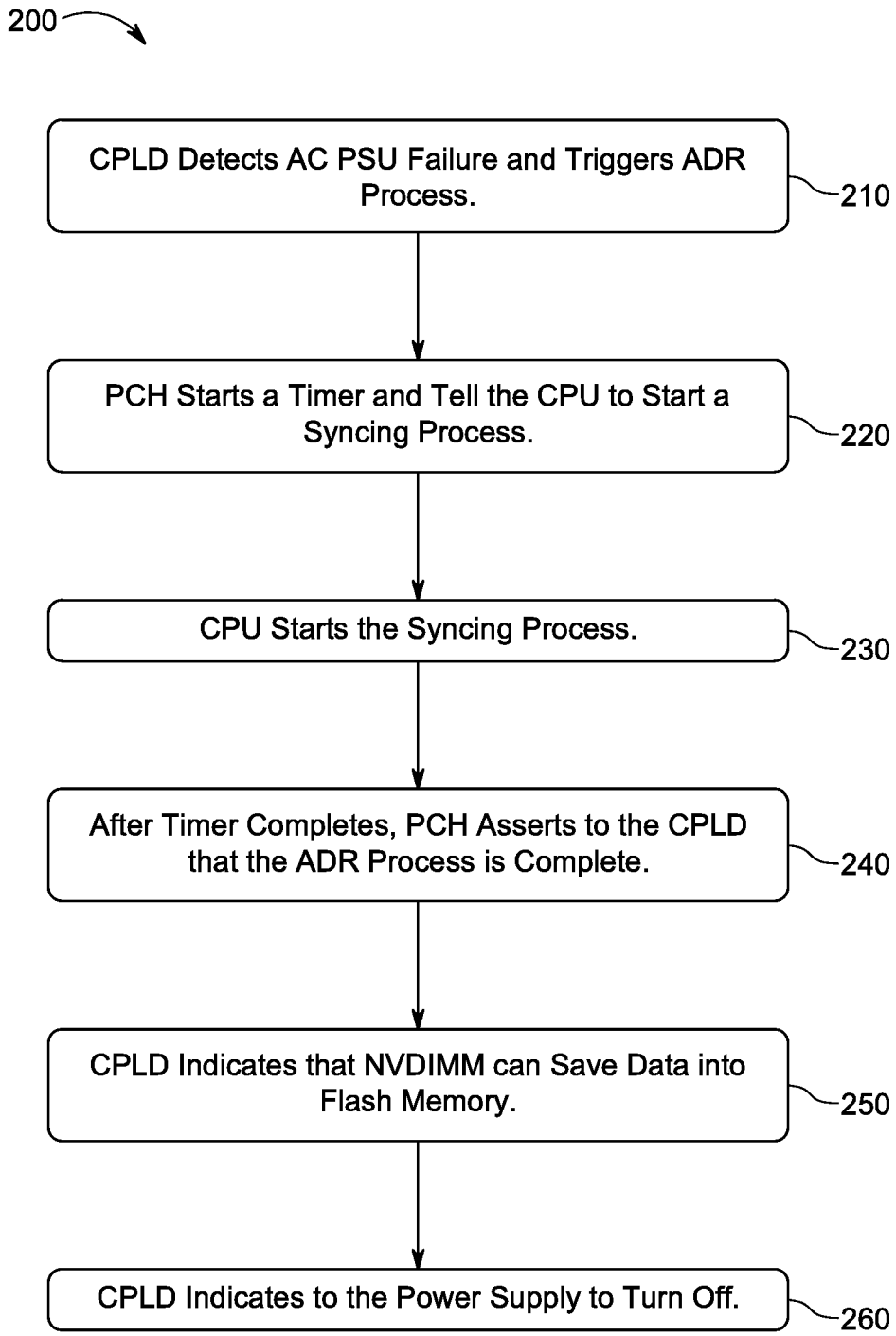
FIG. 1B shows an exemplary method of preserving data during a loss of electrical power, according to a contemporary data preservation module.

With reference to FIG. 1A, FIG. 1B shows a method 200 of a series of steps that a conventional NDVIMM application runs through when AC power is lost in a computer system, such as system 100. The method 200 can begin at step 210 when the logic circuit 150 in the CPLD 140 detects a loss of electrical power from the power supply 130. In response to detecting the lack of electrical power, the logic circuit 150 in the CPLD 140 can trigger an asynchronous dynamic random access memory refresh (ADR). ADR can provide a mechanism to enable preservation of key data in a NDVIMM system which is part of a nonvolatile memory configuration. ADR is a feature supported on Intel chipsets which triggers a hardware interruption to the memory modules 160. This interruption flushes the write-protected data buffers in the memory modules 160 and places the dynamic random access memory (DRAM) into a self-refresh mode. This self-refresh mode ensures that data is in a permanent storage state during a power loss event or system crash.

In step 220, the ADR process causes the PCH 110 to start an ADR timer. The PCH 110 then instructs the CPU 120 to start a syncing process. The timer can be any length and can be configured to be the same length of time that it takes for the CPU 120 to start and complete the syncing process. The ADR timer is an independent function that is not synchronized with the internal clock of the computer system 100. The lack of synchronization can mean that a read or write request for data is not available for retrieval from the memory module at any guaranteed time. The ADR timer is an attempt to allow a proper period of time for the data to be saved, but the ADR timer does not provide an accurate indication of when that data has been preserved.

In step 230, the CPU 120 can start the syncing process. The syncing process can be a memory self-refresh process between the CPU 120 and a memory module 160. This syncing process can transport data from the CPU 120 to non-volatile storage in the memory module 160. For example, the data can be moved to flash memory, which is a kind of memory that retains data in the absence of a power supply. There can be a single memory module 160 (or a set of memory modules 160) interconnected to allow storing of computer data in a second memory module 160 when the first memory module 160 is full. The memory module 160 can be one or more NVDIMMs.

In step 240, after the timer completes, the PCH 110 asserts to the logic circuit 150 in the CPLD 140 that the ADR process is complete. As mentioned earlier with regards to step 220, this can be an inaccurate portrayal of the completion of the CPU sync process.

In step 250, the CPLD 140 responds to the completion of the ADR process by instructing the memory modules 160 to save data into non-volatile flash memory. Saving the data to non-volatile flash memory provides a quick storage location where the data can be preserved after a loss of electrical power. Data can be written more quickly to flash memory than it can to a hard drive. After the completion of step 250, the CPLD 140 instructs the power supply to turn off in step 260. Any data preserved in a non-volatile computer component will be saved, but data remaining in a volatile computer component will be lost.

Figure 2:
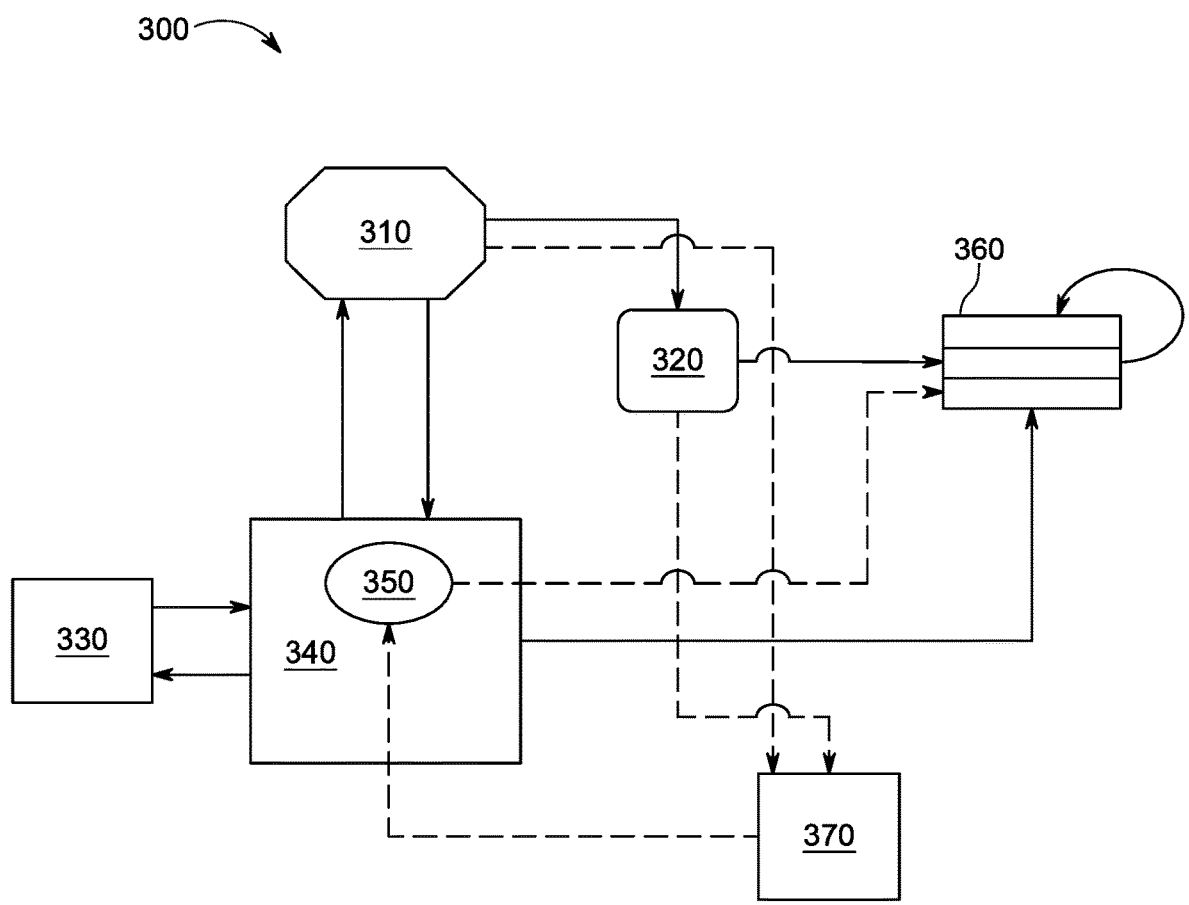
FIG. 2 shows a diagram of a computer system configured to preserve data during a variety of failure scenarios, according to an exemplary embodiment of the present disclosure.

FIG. 2 shows a system 300 configured for enhancing data preservation during a system failure, according to an exemplary embodiment of the present disclosure. System 300 includes a PCH 310, a CPU 320, a power supply 330, a CPLD 340, a logic circuit 350, a memory module 360, and a baseboard management controller (BMC) 370. The PCH 310, CPU 320, power supply 330, CPLD 340, logic circuit 350, and memory module 360 have similar process as those depicted in FIG. 1A. However, in addition to such components, referring back to FIG. 2, system 300 adds a baseboard management controller 370 to allow streamlined communication. The baseboard management controller 370 can receive input on overheating directly from the PCH 310 and/or the CPU 320. Upon receiving input that the PCH 310 and/or the CPU 320 are overheating, the baseboard management controller 370 can inform the CPLD 340 to trigger a data preservation process.

As discussed further below with respect to FIGS. 3-5, the PCH 310 in system 300 is further configured with the ability to communicate with more components in system 300 than in the conventional system 100. This breadth of communication results in a quicker and more accurate data preservation process instead of waiting on a timer to complete.

Figure 3:
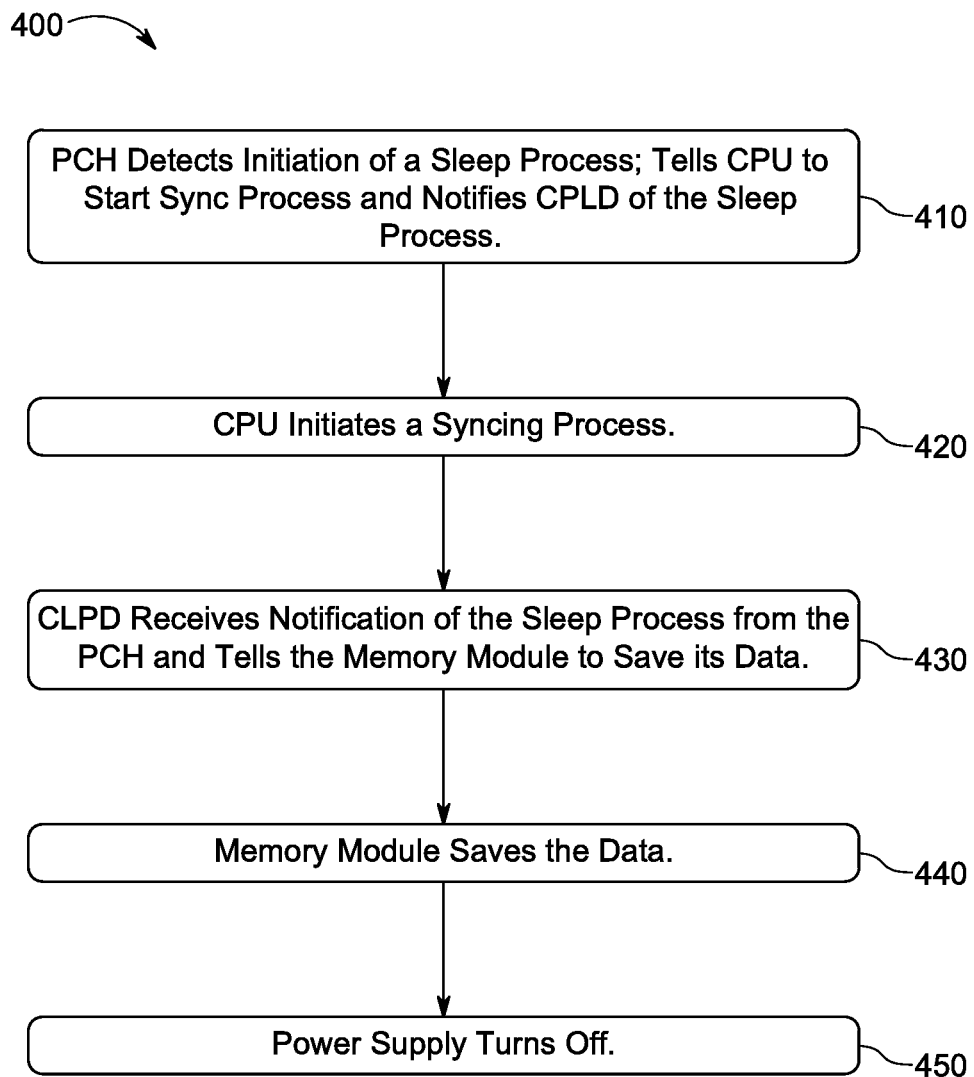
FIG. 3 shows a method of preserving data during a user-initiated shutdown process, according to an exemplary embodiment of the present disclosure.
Figure 4:
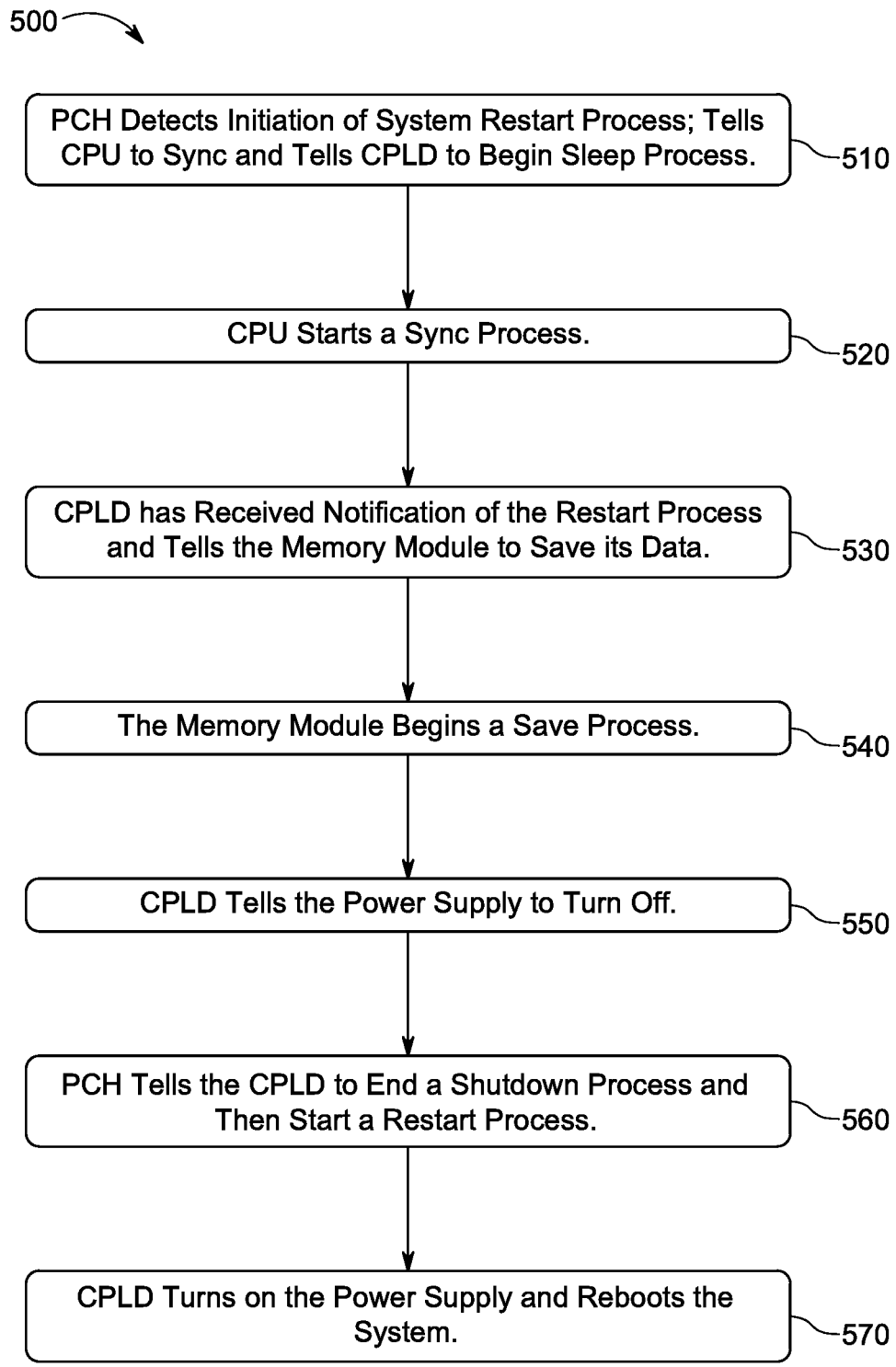
FIG. 4 shows a method of preserving data during a user-initiated restart process, according to an exemplary embodiment of the present disclosure.

FIG. 3 shows a method 400 of a series of steps that an exemplary embodiment of the present disclosure runs through when initiating a sleep process in a computer system. The sleep process can be a temporary low-power mode or a complete shutdown. The sleep process can be user-initiated or software-initiated. For ease of illustration, these steps will be discussed with respect to system 300 in FIG. 2. In step 410, the PCH 310 detects initiation of a sleep process and automatically signals the CPU 320 to begin a syncing process. The PCH 310 also notifies the CPLD 340 of the sleep process. As part of the new configuration of system 300 in FIG. 2 as compared to system 100 in FIG. 1, the PCH 310 can detect initiation of the sleep process. Therefore, there are fewer steps between detection of a low power mode and the important step of syncing data from a volatile computer component (such as the CPU 320) into non-volatile memory.

In step 420, the CPU 320 immediately initiates a syncing process in response to the signal from the PCH 310. The syncing process thus preserves data in volatile memory in the CPU 320 in the non-volatile memory of the memory module 360.

In step 430, the CPLD 340 receives notification of the sleep process from the PCH 310 and can then instruct the memory module 360 to save its contents into a non-volatile component. In step 440, the memory module 360 saves data that both already existed in its memory and that which was added from the CPU 320 sync process in step 420. For example, in step 440, the memory module 360 can preserve its data contents into flash memory.

In step 450, the entire method 400 is terminated when the PCH 310 tells the CPLD 340 to enter a sleep process. The CPLD 340 then turns off the power supply 330.

Thus, this method 400 presents advantages over contemporary processes because the method 400 does not rely on an operating system to save data before entering a sleep process. The operating system can directly start a sleep process while the CPLD and the PCH start to back up data in parallel while the operating systems completes the sleep process. This is a superior process to other methods which rely on the operating system to save data before entering the sleep process.

Additionally, the method 400 allows the PCH 310 to receive notification of the sleep process and then directly instructs the CPU 310 and the memory module 360 to preserve their data. In this method, the PCH 310 does not have to wait for notification from the CPLD 340. Therefore, the method 400 provides quicker data preservation and an accurate completion time so that the computer system 300 can proceed into a sleep mode.

In addition to providing for the preservation of data when a computer system goes into a sleep mode, the system 300 can be configured for other scenarios. FIG. 4 shows a method 500 of a series of steps that an exemplary embodiment of the present disclosure runs through when initiating a restart process in a computer system. The restart process can be software-initiated or user-initiated. For ease of illustration, these steps will be discussed with respect to system 300 in FIG. 3. In step 510, the PCH 310 starts the method 500 by detecting initiation of a system restart process. The PCH 310 then directly tells the CPU 320 to start a sync process. The PCH 310 also notifies the CPLD 340 to begin a restart process. Because the PCH 310 detects initiation of the restart process and directly communicates to the CPU 320, there are no steps between detection of a shutdown and the important step of syncing data from a volatile computer component (such as the CPU 320) into non-volatile memory.

In step 520, the CPU 320 immediately initiates a syncing process in response to the signal from the PCH 310. The syncing process thus preserves data in volatile memory in the CPU 320 into the non-volatile memory of the memory module 360.

In step 530, the CPLD 340 has received notification of the restart process. The CPLD can then tell the memory module 360 to save its data into a non-volatile component. In step 540, the memory module 360 preserves data that both already existed in its memory and that which was added from the CPU 320 sync process in step 520. For example, in step 540, the memory module 160 can preserve its data contents into flash memory.

In step 550, the CPLD 340 tells the power supply 330 to turn off. Unlike method 400, method 500 does not stop here and proceeds to step 560. In step 560, the method 500 proceeds through a restart process for the computer system 300. The PCH 310 tells the CPLD 340 to end a shutdown process and to start a restart process.

In step 570, the CPLD 340 turns on the power supply 330 and reboots the system.

Thus, this method 500 presents advantages over contemporary processes because the method 500 allows for customization of the shutdown process into an efficient procedure for a restart. Just like method 400, method 500 has direct communication advantages which allows the CPU 310 and the memory module 360 to quickly preserve their data. Method 500 can then proceed safely to a system restart.

Figure 5:
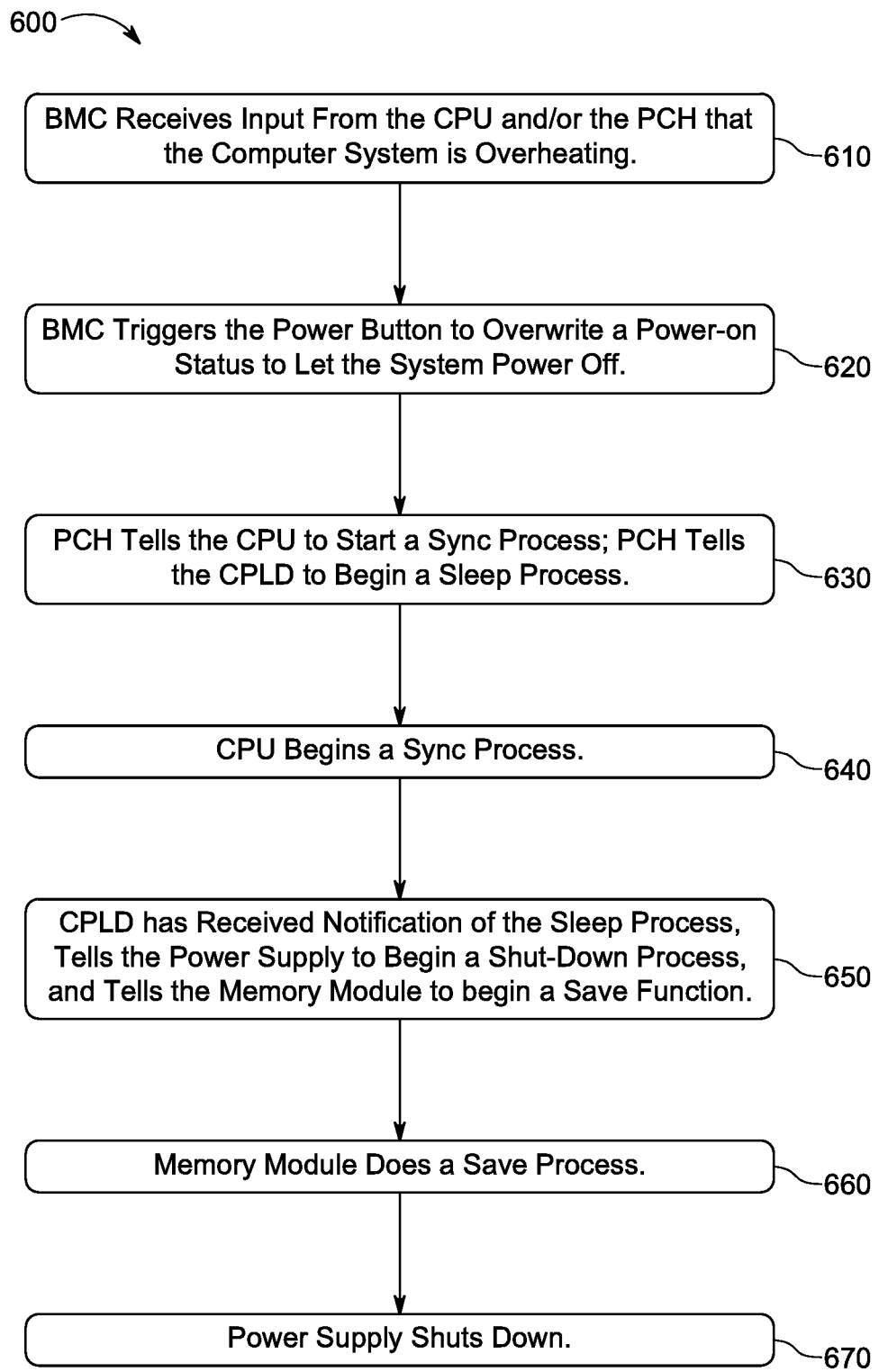
FIG. 5 shows a method of preserving data when any computer system components are overheating, according to an exemplary embodiment of the present disclosure.

FIG. 5 shows a method 600 of a series of steps that an exemplary embodiment of the present disclosure runs through when initiating a forced shutdown after detecting an overheating temperature. For ease of illustration, these steps will be discussed with respect to system 300 in FIG. 3. In step 610, the BMC 370 initiates the method 600 by receiving input from at least one of the CPU 320 and the PCH 310 that a computer component is overheating. The BMC 370 can alternatively receive notice that the computer system 300 is overheating and does not need knowledge of a specific overheating component.

In step 620, the BMC 370 triggers a power button to overwrite a power-on status to let the computer system 300 power off. Step 620 is a mandatory shutdown process initiated to protect one or more computer components from damage to the electrical parts from overheating. A complete shutdown of power can cool off the electrical component because the component will no longer be operational and will be unable to generate heat as a byproduct of operation. Due to the danger of damage to the electrical components, the system 300 needs an immediate shutdown. The BMC 370 provides the required power-off by immediately shutting down a power supply when overheating is detected.

In step 630, the PCH 310 tells the CPU 320 to begin a sync process. The PCH 310 also notifies the CPLD 340 to begin a sleep process. Because the PCH 310 detects initiation of the shutdown process and directly communicates to the CPU 320, there are no steps between detection of a low power mode and the important step of syncing data from a volatile computer component (such as the CPU 320) into non-volatile memory.

In step 640, the CPU 320 initiates a syncing process. The syncing process thus preserves data in volatile memory in the CPU 320 into the non-volatile memory of the memory module 360.

In step 650, the CPLD 340 has received notification of the shutdown process and can tell the memory module 360 to save its data into a non-volatile component. In step 660, the memory module 360 actually performs this step to preserve data that both already existed in its memory and that which was added from the CPU 320 sync process in step 650. For example, in step 660, the memory module 160 can preserve its data contents into flash memory. Step 650 completes when the CPLD 340 tells the power supply 330 to begin a shutdown process. Method 600 completes in step 670 when the power supply 330 shuts down.

Therefore, the present disclosure provides a baseboard management controller 370 which can effectively protect data in volatile memory components should the CPU 320 or the PCH 310 overheat. The method provides effective preservation of data into non-volatile memory components before the power supply 330 shuts the computer system down in order to cease producing heat.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations, and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computer-implemented method for preserving data in memory modules, comprising:
   detecting initiation of a system restart process by a controller hub;
   automatically initiating a syncing process of data contents in a processing unit in response to detecting initiation of the system restart process, wherein automatically initiating the synching process comprises transmitting a sync instruction from the controller hub to the processing unit;
   automatically saving data contents of a memory module; and
   turning off the power supply unit and turning on the power supply unit in response to detecting initiation of the system restart process.

2. The computer-implemented method of claim 1, wherein the system restart process can include at least one of a software-initiated restart process and a user-initiated restart process.

3. The computer-implemented method of claim 2, wherein the software data preservation process further comprises:
in response to turning off the power supply unit, ending the system restart process; and
rebooting the computer system.

4. The computer-implemented method of claim 1, wherein automatically initiating the syncing process of the data contents in the processing unit further comprises:
copying data from volatile memory of the processing unit; and
placing the copied data into the non-volatile memory of the memory module.

5. The computer-implemented method of claim 1, wherein automatically saving data contents of the memory module further comprises saving the data contents into a non-volatile computer component.

6. The computer-implemented method of claim 1, wherein automatically initiating the syncing process of the data contents in the processing unit occurs without a timer associated with an expected period of time to sync the data contents of the processing unit.

7. The computer-implemented method of claim 1, further comprising transmitting a restart instruction from the controller hub to a logic device to begin a restart process, wherein automatically saving data contents of the memory module occurs in response to the restart instruction being received by the logic device.

8. The computer-implemented method of claim 7, wherein transmitting the restart instruction occurs after transmitting the sync instruction.

9. The computer-implemented method of claim 1, wherein automatically saving data contents of the memory module comprises:
receiving, at a logic device, a restart instruction; and
controlling the memory module, in response to receiving the restart instruction, to save the data contents of the memory; and
wherein turning off the power supply unit and turning on the power supply unit comprises:
turning off the power supply unit in response to receiving the restart instruction;
receiving, at the logic device, an end shutdown instruction; and
turning on the power supply in response to receiving the end shutdown instruction.

10. A computer system configured for preserving data in memory modules, comprising:
a power supply unit;
memory modules configured to store data contents;
a processing unit configured to start a memory self-refresh process with the memory modules upon receiving notification to start a syncing process;
a controller hub configured to start a software data preservation process using power from a power supply unit of the computer system, wherein starting the software data preservation process comprises:
detecting initiation of a system restart process by the controller hub; and
automatically initiating a syncing process in the processing unit in response to detecting initiation of the system restart process, wherein automatically initiating the synching process comprises transmitting a sync instruction from the controller hub to the processing unit;
a logic device configured to continue the software data preservation process using power from the power supply unit of the computer system, wherein continuing the software data preservation process comprises:
automatically saving data contents of a memory module; and
turning off the power supply unit and turning on the power supply unit in response to detecting initiation of the system restart process.

11. The computer system of claim 10, wherein the system restart process can include at least one of a software-initiated restart process and a user-initiated restart process.

12. The computer system of claim 11, wherein continuing the software data preservation process further comprises:
ending the system restart process and rebooting the computer system.

13. The computer system of claim 10, wherein automatically initiating the syncing process of the data contents in the processing unit further comprises:
copying data from volatile memory of the processing unit; and
placing the copied data into the non-volatile memory of the memory module.

14. The computer system of claim 10, wherein automatically saving data contents of the memory module further comprises saving the data contents into a non-volatile computer component.

15. The computer system of claim 10, wherein automatically initiating the syncing process of the data contents in the processing unit occurs without a timer associated with an expected period of time to sync the data contents of the processing unit.

16. The computer system of claim 10, wherein starting the software data preservation process further comprises transmitting a restart instruction from the controller hub to the logic device to begin a restart process, wherein continuing the software data preservation process occurs in response to the restart instruction being received by the logic device.

17. The computer system of claim 16, wherein transmitting the restart instruction occurs after transmitting the sync instruction.

18. The computer system of claim 10, wherein automatically saving data contents of the memory module comprises:
receiving, at the logic device, a restart instruction; and
controlling the memory module, in response to receiving the restart instruction, to save the data contents of the memory; and
wherein turning off the power supply unit and turning on the power supply unit comprises:
turning off the power supply unit in response to receiving the restart instruction;
receiving, at the logic device, an end shutdown instruction; and
turning on the power supply in response to receiving the end shutdown instruction.

* * * * *